No. 755,840. PATENTED MAR. 29, 1904.
J. C. BOSE.
DETECTOR FOR ELECTRICAL DISTURBANCES.
APPLICATION FILED SEPT. 30, 1901.
NO MODEL.
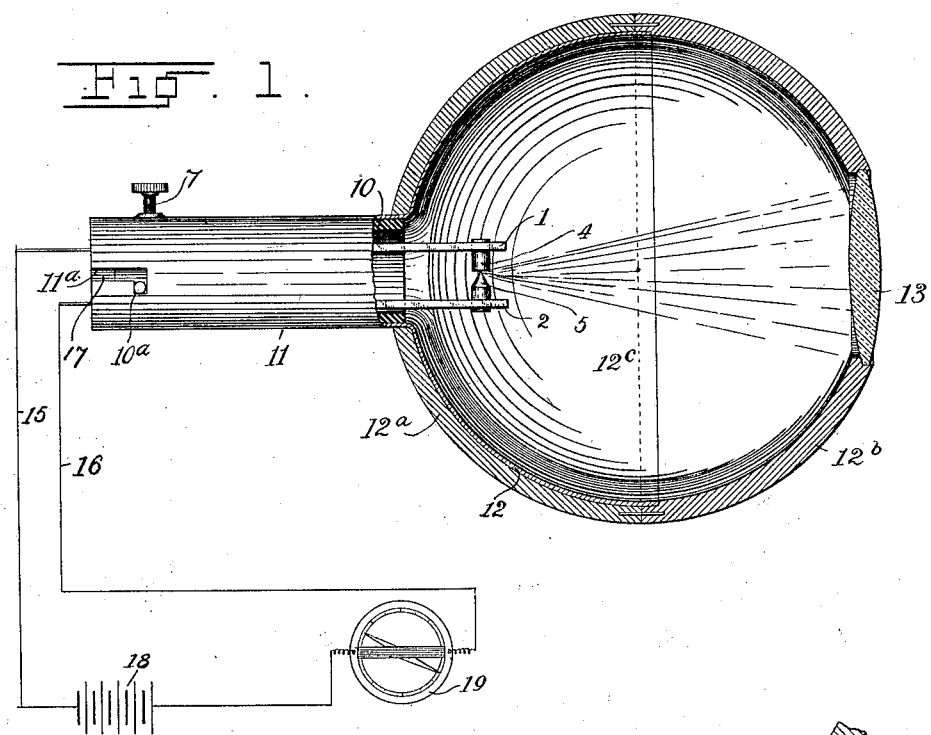
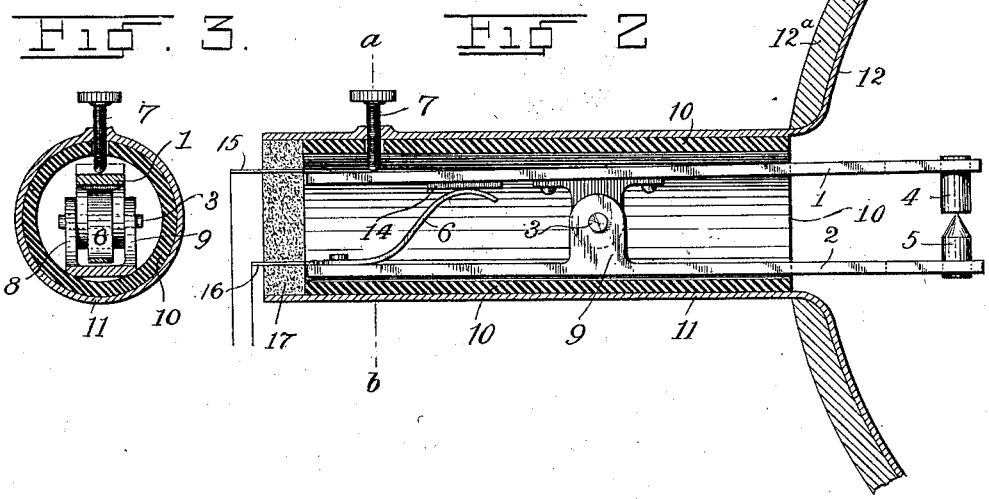
WITNESSES:
Fred White
Thomas F. Wallace
INVENTOR:
Jagadis Chunder Bose,
By his Attorneys:

No. 755,840. Patented March 29, 1904.

UNITED STATES PATENT OFFICE.

JAGADIS CHUNDER BOSE, OF CALCUTTA, INDIA, ASSIGNOR OF ONE-HALF TO SARA CHAPMAN BULL, OF CAMBRIDGE, MASSACHUSETTS.

DETECTOR FOR ELECTRICAL DISTURBANCES.

SPECIFICATION forming part of Letters Patent No. 755,840, dated March 29, 1904.

Application filed September 30, 1901. Serial No. 77,028. (No model.)

*To all whom it may concern:*

Be it known that I, JAGADIS CHUNDER BOSE, a subject of the King of Great Britain and Emperor of India, and a resident of Calcutta, India, have invented certain new and useful Improvements in or Relating to Detectors for Electrical Disturbances or other Radiations and in Electrical Resistances, of which the following is a specification.

This invention has reference to detectors and so-called "coherers" for the reception of electrical disturbances, Hertzian waves, light-waves, and other radiations; and its object is to further improve the sensitiveness and quickness of response of devices of the kind in question.

According to my theory, upon which the invention is based, the changes produced on or in the sensitive substance of a coherer or detector by electrical disturbances, Hertzian waves, light-waves, and other radiations are due to molecular distortion. In order to obtain the best results with a detector or coherer, it is necessary that this distortion shall be removed before the detector or coherer receives fresh radiations—as, for example, the signals in wireless or other telegraphy.

In order to restore the quickness of response of coherers and detectors in actual practice, it is usual to resort to tapping contrivances; but this expedient besides being crude in conception involves expense in construction, complication of apparatus, and must necessarily be slow in action and somewhat spasmodic. According to the present invention I effect this object by subjecting the sensitive substance of a coherer or detector to certain methods, influences, or agencies which will have the effect of removing this distortion, thus hastening the recovery of the substance. For instance, I may subject the sensitive substance to torsional distortion by imparting to the tube or medium containing or carrying the sensitive substance—such, for example, as iron or other filings—either a one-directioned or an oscillatory or vibrational twist. In order that this may be conveniently accomplished, I may place the substance in an elastic tube or elastic medium, the elastic tube or medium having the effect of facilitating the action of the twist upon the sensitive substance and of insuring quick recovery, or with the same object of increasing the sensitiveness and quickness of self-recovery of the sensitive substance I may subject the mass forming the receiver to certain forces, physical surroundings, and conditions suitably adjusted and applied, whereby said mass becomes more responsive to electric disturbances, including Hertzian waves or other forms of radiance. For example, I may produce this effect: (*a*) by annealing or by mechanical treatment; (*b*) by heat; (*c*) by subjecting the substance to increase or reduction of pressure; (*d*) by subjecting the substance to vapors or gases ordinarily applied—for example, by inclosing the substance in an atmosphere of gases or vapors—for instance, ammonia-vapor or carbonic-acid gas; (*e*) by the occlusion of gases in the sensitive substance; (*f*) by surrounding it with various gaseous fluids—for example, $NH_3$ or $CO_2$; (*g*) by proper adjustment of pressure by means of a micrometer-screw or other means till the critical point is approached; (*h*) by creating a partial vacuum in the receptacle in which the sensitive substance is inclosed and adjusting the vacuum until the critical point is reached.

Further, as the response of a detector or coherer is due to distortion, I may according to one part of my invention increase the facility of response of the sensitive substance by allowing various agencies to produce a tendency toward distortion on the verge of signaling or reception of the radiation, the radiation itself precipitating the change.

According to another way of carrying the first part of the invention into effect I may dispense with mechanical means for producing recovery of the coherer or detector by using sensitive substances in which the recovery is automatic.

I have discovered that substances of a certain class possess the property of self-recovery—namely, those which give a characteristic curve representing relative resistances. With such substances if the relation between a continuously-increasing electromotive force and the resulting current be represented by a curve (in which the abscissæ represent the impressed electromotive force and the ordinates the corresponding values of the current) it will be found that such a curve will not be straight, but either convex or concave to the axis of electromotive force. On describing such a curve of variation (the electromotive force rising from zero to a maximum and falling back from maximum to zero) it will be found that with certain substances the ascending and descending or outgoing and return curves coincide. I find that such substances exhibit automatic and rapid self-recovery from the effects of Hertzian waves. I have found that by employing any substance of this class as the sensitive substance of coherers or detectors for electrical disturbances, Hertzian waves, light-waves, and other radiations I can dispense with mechanical means for effecting the recovery of the coherer or detector—that is to say, these substances possess the property of rapid self-recovery.

Of the substances which give a characteristic curve, such as just described, some have the property of presenting a decreasing resistance to the passage of the electric current with an increasing impressed electromotive force, while others have the opposite property—namely, that of presenting an increased resistance as the impressed force increases. For simplicity's sake I will call the substances of the former class "positive" and those of the latter class "negative." I may according to this part of my invention use either class of substances as the sensitive substance of coherers or detectors. As examples of such substances I will mention galena, tellurium, magnesium; (these substances are positive, in the sense just described, and are self-recovering;) halogenated metals—for example, lead and tin; potassium; allotropic silver—namely, silver in a form such as can be obtained by reducing silver chlorid by zinc or by electrolysis; (these substances are all of the negative class and are all self-recovering.) Or I may use chromium, manganese, or zirconium as the sensitive agents in coherers and detectors. These substances are very sensitive and belong to the positive class, as before defined, but are possibly not self-recovering. They may, however, be used with advantage.

According to my invention I may also use ammonia-vapor or carbonic-acid gas in small proportions to stimulate the action of the sensitive agent in coherers or detectors—that is to say, to increase their sensitiveness, the gas being confined in the tube or chamber with the sensitive agent. The ammonia or carbonic-acid gas may also be used in large proportions to produce a depressing action upon the sensitive agent—that is to say, to reduce the sensitiveness thereof.

Another part of my invention has for its object to provide a novel apparatus or instrument for use in detecting or indicating light-waves, Hertzian waves, and other radiations. This apparatus when arranged for use with light-waves may be regarded as an artificial retina. By suitably modifying the arrangement, however, as hereinafter described, it may be used as a coherer or detector of Hertzian waves for the purpose of wireless or other telegraphy or for the reception of other radiations. In this apparatus or instrument a sensitive substance, positive or negative in the sense above defined and which gives a characteristic curve of the kind above described or which is made to give such characteristic curve by any of the methods of treatment above described, is employed. Both the positive and negative classes of sensitive substances when suitably disposed—as, for example, in the instrument hereinafter described—will respond to and may be caused to indicate light-waves, Hertzian waves, or other radiations by means of a galvanometer or other suitable electrical indicating or recording apparatus. In order, however, that the apparatus to which this invention relates shall work to the best advantage, it is desirable that the distortion, whether positive or negative, produced by the light-wave or other radiation shall not only be readily detected and indicated, but also that the substance shall return to its normal state upon the cessation of the impressed radiation. For this reason it is desirable to use substances having a characteristic curve of the kind above referred to or to provide means whereby said substances shall be caused to give such characteristic curve.

I will proceed to describe an apparatus constructed in accordance with this part of the invention, it being understood that I do not confine myself to the exact details of same, which may be varied without departing from the spirit of the invention.

In the accompanying drawings, Figure 1 is a diagrammatic view showing the instrument partly in longitudinal section connected up in an electric circuit with a galvanometer, as hereinafter described. Fig. 2 is a part-longitudinal section of the instrument, on a larger scale than Fig. 1, showing the contact-carrying arms, contacts, and mechanism of the instrument. Fig. 3 is a vertical section on the line $a\ b$ of Fig. 2.

Referring to the drawings, 1 2 are horizontal arms of electrically-conducting material mounted upon a pivot 3 at a point intermediate between them. For this purpose the arms 1 2 each carry hinge or pivot cheeks 8 9, of insulating material. The inner extremity of each arm 1 2 is bifurcated, and in the respective bifurcations are fitted contacting pieces 4 5, of suitable positive or negative substance, sensitive to light-waves, Hertzian waves, or other radiations and giving the characteristic curve before mentioned, and thus having the property of self-recovery above described—such, for example, as the positive substances, galena or tellurium, or, as before mentioned, other substances which do not themselves give the characteristic curve may be used if suitable conditions or agencies be caused to act upon them to cause them to give such a characteristic curve, and thus become self-recovering. As shown, one of the contact-pieces 4 5 may be cylindrical in shape and of uniform dimensions and the other taper to a point. The contacts 4 5 are normally held together by a spring 6, arranged between the arms 1 2, and the pressure of which can be regulated with great delicacy by means of a micrometer-screw 7, provided for the purpose. The pivoted arms 1 2 and their spring 6 are fitted in a tube 10, of ivory or other insulating material, this being in turn inserted in the tubular extension 11 of a hemispherical or other suitably-shaped metal case 12, which may conveniently constitute a reflector.

The tube 10 carries a pin $10^a$, engaging in a bayonet-slot $11^a$ of the extension 11 to enable the tube 10 to be readily inserted and secured in said extension, or any other suitable means may be provided with the same object, as will be readily understood. The part 12 of the instrument may be inclosed, as shown, in a wooden or other shell $12^a$ $12^b$, of spherical or other form, and which may for convenience be made in sections adapted to be connected together by pins fitting into suitable holes, as shown. A chamber $12^c$ is thus constituted. A hole is provided in the section $12^b$ of this chamber, in which a lens may be placed, as hereinafter described.

By means of the insulating-cheeks 8 9, tube 10, and insulating bearing-surface 14 of the spring 6 the conducting-arms 1 2 are insulated from the case and from each other except at the point of contact of the sensitive contacts 4 5.

A female thread is provided at a suitable point of the extension 11 to receive the micrometer-screw 7, this screw passing down through or escaping the end of the insulating-tube 10 and bearing upon the upper arm 1. The micrometer-screw should be provided with an insulating-head. By turning the screw 7 the pressure of the spring 6 may thus be adjusted with great nicety in order to adjust the force of contact between 4 and 5.

Wires 15 16, preferably insulated wires, lead, respectively, from the arms 1 2 and pass out through a plug 17, of cork or other insulating material, fitted in the end of the extension 11. By means of these wires the arms 1 2 and contacts 4 5 may be connected up in the circuit of an electric battery or other source of electricity 18, in which circuit a sensitive galvanometer 19—for example, a dead-beat d'Arsonval galvanometer—is interposed as an indicator. Instead of a galvanometer other suitable electric indicating or recording apparatus may be used.

The contacts 4 5 may project to any desired extent into the chamber $12^c$, according to the focus of the lens fitted in the opening therein. The tube 10 with the arms 1 2 may be movable in the extension 11 for the purpose of focusing the contacts 4 5 with respect to the lens employed.

By placing an ordinary glass lens 13 in the opening in the wall of the case-section $12^b$ opposite the sensitive contacts 4 5 of the instrument and by throwing light upon this lens an immediate response is observed in the galvanometer, the needle of which is deflected in accordance with the spectral properties of the light thrown upon the sensitive contacts or artificial retina. With a glass lens the instrument will detect and record lights not only some way beyond the violet, but also in regions far below the infra-red in the invisible regions of electric radiation. We may thus style the apparatus a "tejometer" (Sanscrit $tej$=radiation) or universal radiometer.

Instead of using an ordinary glass lens, as above described, we may use a water-lens, and in this case the range of what we may term the "spectral vision" of the instrument may be reduced to a level which more nearly corresponds to that of the human eye, the water-lens absorbing the naturally invisible radiations before they reach the sensitive substances of the instrument corresponding to the retina viva.

By removing the metallic and wooden casings and lens the instrument may be used as a detector or so-called "coherer" for wireless or other telegraphy.

The apparatus hereinbefore described is self-recovering when the sensitive substances used therein have a characteristic curve of the kind before described—that is to say, that the distortion produced in the sensitive contacts by a wave or radiation caused to impinge thereon is automatically removed upon the cessation of the wave or radiation and leaves the sensitive substance *in statu quo ante*, or, as above mentioned, the same effect can be obtained by subjecting or exposing the sensitive substances in the apparatus to influences or agencies which will cause them to give the curve in question.

What I claim, and desire to secure by Letters Patent, is—

1. In a coherer or detector of electrical disturbances, Hertzian waves, light-waves or other radiations, a sensitive substance having a characteristice curve (giving the relation between an increasing impressed electromotive force and the resultant current passing through the sensitive substance), which is not straight but is either convex or concave to the axis of electromotive force and in which the return curve with a decreasing electromotive force when taken slowly, approximately coincides with the former curve.

2. In and for a coherer or detector of electrical disturbances, Hertzian waves, light-waves, or other radiations, galena as a sensitive substance.

3. A coherer or detector of electrical disturbances, Hertzian waves, light-waves or other radiations, comprising contacting pieces of sensitive substance having a characteristic curve (giving the relation between an increasing impressed electromotive force and the resultant current passing through the sensitive substance), which is not straight but is either convex or concave to the axis of electromotive force and in which the return curve with a decreasing electromotive force when taken slowly, approximately coincides with the former curve, in combination with means for adjusting the force of contact between said contacting pieces.

4. A coherer or detector of electrical disturbances, Hertzian waves, light-waves, or other radiations, comprising contacting pieces of sensitive substance having a characteristic curve (giving the relation between an increasing impressed electromotive force and the resultant current passing through the sensitive substance) which is not straight but is either convex or concave to the axis of electromotive force and in which the return curve with a decreasing electromotive force when taken slowly, approximately coincides with the former curve, pivoted conducting-arms carrying said contacting pieces, a spring tending to hold said contacts together, and a micrometer-screw for adjusting the force of contact of said contacting pieces, substantially as described.

5. A coherer or detector of electrical disturbances, Hertzian waves, light-waves, or other radiations, comprising a pair of contacts of sensitive substance having a characteristic curve (giving the relation between an increasing impressed electromotive force and the resultant current passing through the sensitive substance), which is not straight but is either convex or concave to the axis of electromotive force and in which the return curve with decreasing electromotive force when taken slowly, approximately coincides with the former curve, pivoted conducting-arms carrying said contacts and insulated from each other except at the contacting point of said contacts, a spring tending to hold said contacts together, a micrometer-screw for adjusting the force of contact of said contacts, and means for insulating said arms from each other except at the point of contact of said contacting pieces and from external objects, substantially as described.

6. A coherer or detector of electrical disturbances, Hertzian waves, light-waves, or other radiations, comprising a pair of galena contacts, pivoted conducting-arms carrying said contacts and insulated from each other except at the contacting point of said contacts, a spring tending to hold said contacts together, a micrometer-screw for adjusting the force of contact of said contacts, and means for insulating said arms from each other except at the point of contact of said contacting pieces and from external objects, substantially as described.

7. In apparatus for receiving light-waves, contacting pieces of sensitive substance which will give a characteristic curve (giving the relation between an increasing impressed electromotive force and the resultant current passing through the sensitive substance) which is not straight, but convex or concave to the axis of electromotive force and in which the return curve with a decreasing electromotive force when taken slowly, approximately coincides with the former curve, in combination with a chamber inclosing said contacting pieces, and a lens disposed to direct light-rays onto said contacting pieces, substantially as described.

8. In apparatus for receiving light-waves, contacting pieces of sensitive substance which will give a characteristic curve (giving the relation between an increasing impressed electromotive force and the resultant current passing through the sensitive substance) which is not straight, but either convex or concave to the axis of electromotive force, and in which the return curve with a decreasing electromotive force, when taken slowly, approximately coincides with the former curve, said contacting pieces being in combination with conducting-arms carrying the same, said arms being pivoted together, a spring tending to hold said contacting pieces together, means for adjusting the force of said spring and therefore the force of contact of said contacting pieces, means for insulating said arms from each other except at the contacting point of said contacting pieces, and from external objects, a chamber into which said contacting pieces project, and a lens carried by said chamber, all substantially as described.

9. In apparatus for receiving light-waves, contacting pieces of sensitive substance which will give a characteristic curve (giving the relation between an increasing impressed electromotive force and the resultant current passing through the sensitive substance) which is not straight, but either convex or concave to the axis of electromotive force and in which the return curve with a decreasing electromotive force, when taken slowly, approximately coincides with the former curve, said contacting pieces being in combination with conducting-arms carrying same, said arms being pivoted together, a spring tending to hold said contacting pieces together, means for adjusting the force of said spring and therefore the force of contact of said contacting pieces, means for insulating said arms from each other except at the contacting point of said contacting pieces, and from external objects, a chamber into which said contacting pieces project, and a water-lens carried by said chamber, all substantially as described.

10. In apparatus for receiving light-waves, contacting pieces of sensitive substance which will give a characteristic curve (giving the relation between an increasing impressed electromotive force and the resultant current passing through the sensitive substance) which is not straight, but either convex or concave to the axis of electromotive force and in which the return curve with a decreasing electromotive force, when taken slowly, approximately coincides with the former curve, said contacting pieces being in combination with conducting-arms carrying the same, said arms being pivoted together, a spring tending to hold said contacting pieces together, a micrometer-screw adapted to adjust the force of said spring and therefore the force of contact of said contacting pieces, an insulating-tube in which said arms and spring are fitted, means for insulating said arms from each other except at the point of contact of said contacting pieces, a metallic part such as 12 having an extension such as 11, a casing or chamber such as $12^a$ $12^b$, and a lens fitted in said chamber, all substantially as and for the purpose described.

In witness whereof I have hereunto signed my name in the presence of two subscribing witnesses.

JAGADIS CHUNDER BOSE.

Witnesses:
REGINALD EATON ELLIS,
THOMAS LANY WHITEHEAD.